United States Patent
Aiello et al.

(10) Patent No.: US 10,170,151 B2
(45) Date of Patent: Jan. 1, 2019

(54) METHOD AND SYSTEM FOR HANDLING RANDOM ACCESS WRITE REQUESTS FOR A SHINGLED MAGNETIC RECORDING HARD DISK DRIVE

(71) Applicant: Microsemi Storage Solutions (U.S.), Inc., Aliso Viejo, CA (US)

(72) Inventors: Anthony Frank Aiello, Santa Clara, CA (US); Robert Caldwell, Orlando, FL (US)

(73) Assignee: Microsemi Solutions (U.S.), Inc., Aliso Viejo, CA (US)

( * ) Notice: Subject to any disclaimer, the term of this patent is extended or adjusted under 35 U.S.C. 154(b) by 16 days.

(21) Appl. No.: 15/387,164

(22) Filed: Dec. 21, 2016

(65) Prior Publication Data

US 2017/0249969 A1    Aug. 31, 2017

Related U.S. Application Data

(60) Provisional application No. 62/301,202, filed on Feb. 29, 2016.

(51) Int. Cl.
   *G06F 12/00*    (2006.01)
   *G11B 20/12*    (2006.01)
   (Continued)

(52) U.S. Cl.
   CPC .......... *G11B 20/1217* (2013.01); *G06F 3/061* (2013.01); *G06F 3/0647* (2013.01);
   (Continued)

(58) Field of Classification Search
   None
   See application file for complete search history.

(56) References Cited

U.S. PATENT DOCUMENTS 5,208,813 A * 5/1993 Stallmo ............... G06F 11/1092
                                                            714/6.32
7,996,645 B2   8/2011 New et al.
(Continued)

OTHER PUBLICATIONS

International Patent Application No. PCT/US2016/068066, International Search Report and Written Opinion dated Mar. 10, 2017.

*Primary Examiner* — Brian R Peugh
*Assistant Examiner* — Jason W Blust
(74) *Attorney, Agent, or Firm* — Leber IP Law; Dennis R. Haszko

(57) ABSTRACT

Methods, devices and systems are provided for making a shingled magnetic recording (SMR) hard disk drive operate with similar random access characteristics of a conventional hard drive despite the SMR disk having strict sequential write requirements. A virtual space manager manages a virtual address space, which is visible to a host system, and maps virtual addresses to logical addresses on the SMR disk. A logical space manager controls the placement of data on the SMR disk and ensures that writes to the disk comply with the sequential write requirements. The disk is subdivided into a plurality of stripes each comprising one or more blocks. When a block located within a stripe is to be rewritten with new data, the entire stripe is read from the SMR disk into a memory of the system, the stripe is modified in the memory to replace the previous data stored in the block with the new data, and the modified stripe is written to a new, next available stripe on the disk.

17 Claims, 9 Drawing Sheets

(51) Int. Cl.
*G06F 12/02* (2006.01)
*G06F 3/06* (2006.01)
*G06F 12/0802* (2016.01)
*G11B 20/10* (2006.01)

(52) U.S. Cl.
CPC .......... *G06F 3/0656* (2013.01); *G06F 3/0665* (2013.01); *G06F 3/0673* (2013.01); *G06F 12/0253* (2013.01); *G06F 12/0802* (2013.01); *G06F 2212/60* (2013.01); *G11B 2020/10916* (2013.01)

(56) References Cited

U.S. PATENT DOCUMENTS

| | | |
|---|---|---|
| 8,959,281 B1 | 2/2015 | Malina et al. |
| 9,286,936 B1* | 3/2016 | Poudyal ............ G11B 20/1217 |
| 9,383,923 B1* | 7/2016 | Malina ................ G06F 3/0608 |
| 2008/0250199 A1 | 10/2008 | Lubbers |
| 2013/0007380 A1* | 1/2013 | Seekins ................ G06F 3/0616 |
| | | 711/154 |
| 2014/0019680 A1 | 1/2014 | Jin et al. |
| 2014/0047261 A1 | 2/2014 | Patiejunas et al. |
| 2014/0082274 A1 | 3/2014 | Despins et al. |
| 2015/0135005 A1 | 5/2015 | Hsu-Hung et al. |
| 2015/0318022 A1 | 11/2015 | Sutardja et al. |
| 2015/0378621 A1 | 12/2015 | Bruner et al. |
| 2017/0090763 A1* | 3/2017 | Horn ................... G06F 3/0604 |
| 2017/0123944 A1* | 5/2017 | Macko ............. G11B 20/10527 |

\* cited by examiner

METHOD AND SYSTEM FOR HANDLING RANDOM ACCESS WRITE REQUESTS FOR A SHINGLED MAGNETIC RECORDING HARD DISK DRIVE

CROSS-REFERENCE TO RELATED APPLICATIONS

This application claims the benefit of U.S. Provisional Application No. 62/301,202, filed Feb. 29, 2016, which is herein incorporated by reference.

FIELD

The present disclosure relates to electronic storage devices. More particularly, the present disclosure relates to shingled magnetic recording (SMR) hard disk drives (HDDs), sometimes referred to herein simply as SMR disks.

BACKGROUND

Hard disk drives are data storage devices for storing digital information or data, which can be retrieved at a later time. A hard disk drive is a type of non-volatile memory that retains stored data irrespective of whether the drive has power. A hard disk drive comprises platters or disks coated with a magnetic material for storing charges. Data is stored by placing a charge on the magnetic material. The hard disk drive also comprises one or more read and write heads. The heads are configured to store charges to, and read charges from, the magnetic material of the platter. The heads are arranged on a moving actuator arm which positions the heads over the platters at the correct location to write data to, or read data from, the platters as the platters rotate at high speeds.

The use of platters and heads permits data to be read from or written to a hard disk drive in a random-access manner. Randomly accessing data refers to reading or writing a first set of data at a first location on the platter and then a second set of data at second location on the platter without having to read or write data through all intervening locations between the first and second locations.

A disk drive typically stores data within sectors of the disk. A sector is a segment of a track, and a track is a circle of recorded data on a single platter. The sector unit is usually the smallest size of data to be stored in a hard disk drive and a data file usually consists of several sector units. A digital disk drive is a block storage device, where a disk is divided into logical blocks, which are a collection of sectors. Blocks are addressed using their logical block addresses (LBA). Reading from or writing to a digital disk drive is typically performed at the granularity of blocks.

Platters are divided into multiple co-centric circular tracks, the circular tracks radiating from the center to the edge of the platter. The tracks have a width. The tracks help identify or reference the physical location where data may be, or is, stored on the platter. The width of the tracks may correspond to the width of the read or write header. Adjacent tracks may be grouped into bands or "zones" in the case of SMR disks, with a zone consisting of many sectors.

Conventional hard disk drives store data by writing magnetic tracks parallel to one another (perpendicular recording) in a non-overlapping fashion. SMR disk drives take advantage of the fact that a read head of a disk drive is typically narrower than a write head of the drive. SMR disk drives write new tracks that partially overlap a previously written track, which leaves the previous track narrower than its original width. The disk drive can still read data from the previous track in its narrow form. The overlapping of tracks in an SMR disk allows for higher track density compared to conventional non-overlapping disks.

FIG. 1A shows a 90 degree portion of an example platter 2 of an SMR disk drive, as known in the art. The platter 2 comprises a plurality of tracks 4, which are organized into zones 6. Adjacent zones 6 are separated by a buffer or guard region 8. An area of the platter 2, such as zone 10, may be used for disk management or other purposes. One or more read and write heads of the disk are not shown.

FIG. 1B shows a top view of a portion of a platter 100 of an SMR disk, as known in the art, showing portions of two adjacent zones, zone A 104 and zone B 110. Zone A 104 comprises tracks 102a-c. Tracks 102a-c overlap with each other in a "shingled" fashion. Tracks of a zone A 104 do not overlap, however, with tracks of any adjacent zone (here zone B 110) as zones are separated with a buffer or guard region 112. The writing of tracks 102a-c in an overlapping manner permits more tracks to be stored on a platter of a given size, which thus increases the data density of the platter and the hard disk drive.

When data is to be rewritten to the disk, a problem arises because the write head 108 of the disk is wider than the tracks. For example, in FIG. 1B, write head 108 is wider than track 102a. As a result, if the disk rewrites one or more blocks in track 102a, an adjacent part of track 102b will be overwritten as well, which destroys the data stored in the overwritten part of track 102b. Accordingly, data cannot be written to SMR disks in the same random access manner as in conventional hard disk drives.

SMR disks therefore typically impose strict rules including that writes must proceed sequentially through a zone on the disk with each sector being written exactly once. Within each zone, writes must start at the zeroth sector of the zone and proceed in order to the end of the zone. Write access to any previously written sector must be preceded by a reset of the write pointer of the zone, effectively erasing all content from the zone.

Many file systems require the ability to write to a disk drive in a random access manner, including updates to previously written data, which are performed as write-in-place updates. Accordingly, the sequential write requirements of SMR disks make them inherently incompatible with file systems that support random write access.

SUMMARY

In an aspect, the present disclosure is directed to a storage adapter device for handling write requests for a shingled magnetic recording (SMR) disk, the storage adapter comprising: a memory; and a processor in communication with the memory, the processor configured to control the storage adapter device to: receive a request to write new data to a block having a virtual block address, where the SMR disk is configured to write data into a plurality of zones subdivided into a plurality of stripes, and where each stripe is subdivided into a plurality of blocks, and where data written within each zone is written sequentially in the zone in one or more next available stripes; look up, in metadata stored in the memory, a first logical stripe identifier corresponding to a virtual stripe identifier associated with the virtual block address; control the SMR disk to read the stripe corresponding to the first logical stripe identifier, modify data of the stripe read by the SMR disk by replacing previous data in the block with the new data, and control the SMR disk to write the modified data of the stripe in a next available stripe on the SMR disk; and update the metadata to replace the mapping of the virtual stripe identifier from the first logical stripe identifier to a second logical stripe identifier corresponding to the location of the next available stripe on the SMR disk.

In another aspect, the write request includes writing data to a new block having a virtual block address that is not associated with a logical stripe identifier in the metadata, and where the new block is not part of a plurality of new blocks forming a full stripe to be written as part of the write request, the storage adapter device further configured to: buffer the new block in a cache; form a new stripe with the new block and other buffered blocks; control the SMR disk to write the new stripe in a next available stripe on the SMR disk; and update the metadata to map a virtual stripe identifier associated with the virtual block address to a logical stripe identifier corresponding to the location of the next available stripe on the SMR disk.

In another aspect, when the write request includes writing new data to all of the blocks of a given stripe, the storage adapter device is configured to control the SMR disk to write the new data in a next available stripe on the SMR disk without first reading the given stripe from the SMR disk.

In another aspect, the storage adapter device is further configured to store validity tracking information for tracking whether each of a plurality of stripes within one or more of the zones on the SMR disk is valid or invalid; and update the validity tracking information to indicate that the stripe on the SMR disk corresponding to the first logical stripe identifier is invalid to reflect the moving of the stripe to the next available stripe on the SMR disk.

In another aspect, the storage adapter device is further configured to manage a garbage collection procedure in which the storage adapter device is configured to: determine that a zone on the SMR disk is depleted when a number of invalid stripes in the zone has exceeded a threshold value based on the validity tracking information; control the SMR disk to read the valid stripes in the depleted zone; control the SMR disk to write the data of the valid stripes into available stripes in one or more migration zones other than the depleted zone; update the metadata to map the virtual stripe identifiers of the valid stripes to logical stripe identifiers corresponding to locations of the available stripes in the one or more migration zones; and update the validity tracking information to indicate that all of the stripes in the depleted zone are invalid, thereby allowing the depleted zone to be reclaimed.

In another aspect, the storage adapter device is further configured to control the SMR disk to reset a write pointer for the depleted zone to the lead block in the depleted zone.

In another aspect, the storage adapter device is further configured to maintain at least two pools of stripes available for writing on the SMR disk including: an active write pool of available stripes for servicing write requests originating from a host system; and a migration pool of available stripes for use in moving valid stripes from a depleted zone to one or more other zones in a garbage collection procedure.

In another aspect, the storage adapter device is further configured to store and maintain mappings between virtual stripe identifiers and logical stripe identifiers in the metadata for all blocks allocated to a host system.

In another aspect, the storage adapter device is further configured to control the SMR disk to write data to a zone in minimum increments of one stripe.

In another aspect, the storage adapter device is further configured to look up the logical stripe identifier in the metadata using the virtual stripe identifier as a lookup key.

In another aspect, the storage adapter device is further configured to allocate, prior to receiving a write request, the memory for storing the metadata in one or more persistent storage resources.

In another aspect, the allocating comprises allocating resources in a conventional zone of the SMR disk, where the conventional zone is random access.

In another aspect, the storage adapter device is further configured to page the at least part of the metadata on a storage resource of the host system.

In another aspect, the storage adapter device is further configured to write stripes within zones on the SMR disk according to a first fit algorithm.

In another aspect, wherein the size of a stripe is within the range of 64 kilobytes (KB) to 2 megabytes (MB).

In another aspect, the virtual block address belongs to a virtual address space allocated exclusively to a virtual disk implemented on the SMR disk.

In another aspect, the present disclosure is directed to a method for handling write requests for a shingled magnetic recording (SMR) disk, the method comprising: receiving a request to write new data to a block having a virtual block address, where the SMR disk is configured to write data into a plurality of zones subdivided into a plurality of stripes, and where each stripe is subdivided into a plurality of blocks, and where data written within each zone is written sequentially in the zone in one or more next available stripes; looking up, in metadata stored in a memory, a first logical stripe identifier corresponding to a virtual stripe identifier associated with the virtual block address; controlling the SMR disk to read the stripe corresponding to the first logical stripe identifier, modifying data of the read stripe by replacing previous data in the block with the new data, and controlling the SMR disk to write the modified data of the stripe in a next available stripe on the SMR disk; and updating the metadata to replace the mapping of the virtual stripe identifier from the first logical stripe identifier to a second logical stripe identifier corresponding to the location of the next available stripe on the SMR disk.

In another aspect, the method includes, when the write request includes writing data to a new block having a virtual block address that is not associated with a logical stripe identifier in the metadata, and where the new block is not part of a plurality of new blocks forming a full stripe to be written as part of the write request: buffering the new block in a cache; forming a new stripe with the new block and other buffered blocks; controlling the SMR disk to write the new stripe in a next available stripe on the SMR disk; and updating the metadata to map a virtual stripe identifier associated with the virtual block address to a logical stripe identifier corresponding to the location of the next available stripe on the SMR disk.

In another aspect, the method includes, wherein when the write request includes writing new data to all of the blocks of a given stripe, controlling the SMR disk to write the new data in a next available stripe on the SMR disk without first reading the given stripe from the SMR disk.

In another aspect, the method includes storing validity tracking information for tracking whether each of a plurality of stripes within one or more of the zones on the SMR disk is valid or invalid; and updating the validity tracking information to indicate that the stripe on the SMR disk corresponding to the first logical stripe identifier is invalid to reflect the moving of the stripe to the next available stripe on the SMR disk.

In another aspect, the method includes a garbage collection procedure that comprises determining that a zone on the SMR disk is depleted when a number of invalid stripes in the zone has exceeded a threshold value based on the validity tracking information; controlling the SMR disk to read the valid stripes in the depleted zone; controlling the SMR disk to write the data of the valid stripes into available stripes in one or more migration zones other than the depleted zone; updating the metadata to map the virtual stripe identifiers of the valid stripes to logical stripe identifiers corresponding to locations of the available stripes in the one or more migration zones; and updating the validity tracking information to indicate that all of the stripes in the depleted zone are invalid, thereby allowing the depleted zone to be reclaimed.

In another aspect, the method includes controlling the SMR disk to reset a write pointer for the depleted zone to the lead block in the depleted zone.

In another aspect, the method includes maintaining at least two pools of stripes available for writing on the SMR disk including an active write pool of available stripes for servicing write requests originating from a host system; and a migration pool of available stripes for use in moving valid stripes from a depleted zone to one or more other zones in a garbage collection procedure.

In another aspect, the method includes storing and maintaining mappings between virtual stripe identifiers and logical stripe identifiers in the metadata for all blocks allocated to a host system.

In another aspect, the SMR disk is controlled to write data to a zone in minimum increments of one stripe.

In another aspect, the looking up the logical stripe identifier in the metadata uses the virtual stripe identifier as a lookup key.

In another aspect, the method further comprises allocating, prior to the receiving a write request, the memory for storing the metadata in one or more persistent storage resources.

In another aspect, the allocating comprises allocating resources in a conventional zone of the SMR disk, where the conventional zone is random access.

In another aspect, the method further comprises paging the at least part of the metadata on a storage resource of a host system.

In another aspect, the writing of stripes within zones on the SMR disk in response to the write request is performed according to a first fit algorithm.

In another aspect, the size of a stripe is within the range of 64 kilobytes (KB) to 2 megabytes (MB).

In another aspect, the virtual block address belongs to a virtual address space allocated exclusively to a virtual disk implemented on the SMR disk.

In another aspect, the present disclosure is directed to a non-transitory computer-readable storage medium storing instructions that when executed by at least one processor cause the performance of operations for handling write requests for a shingled magnetic recording (SMR) disk, the operations comprising: receiving a request to write new data to a block having a virtual block address, where the SMR disk is configured to write data into a plurality of zones subdivided into a plurality of stripes, and where each stripe is subdivided into a plurality of blocks, and where data written within each zone is written sequentially in the zone in one or more next available stripes; looking up, in metadata stored in a memory, a first logical stripe identifier corresponding to a virtual stripe identifier associated with the virtual block address; controlling the SMR disk to read the stripe corresponding to the first logical stripe identifier, modifying data of the read stripe by replacing previous data in the block with the new data, and controlling the SMR disk to write the modified data of the stripe in a next available stripe on the SMR disk; and updating the metadata to replace the mapping of the virtual stripe identifier from the first logical stripe identifier to a second logical stripe identifier corresponding to the location of the next available stripe on the SMR disk.

BRIEF DESCRIPTION OF THE DRAWINGS

Embodiments of the present disclosure will now be described, by way of example only, with reference to the attached Figures.

DETAILED DESCRIPTION

Figure 1A:
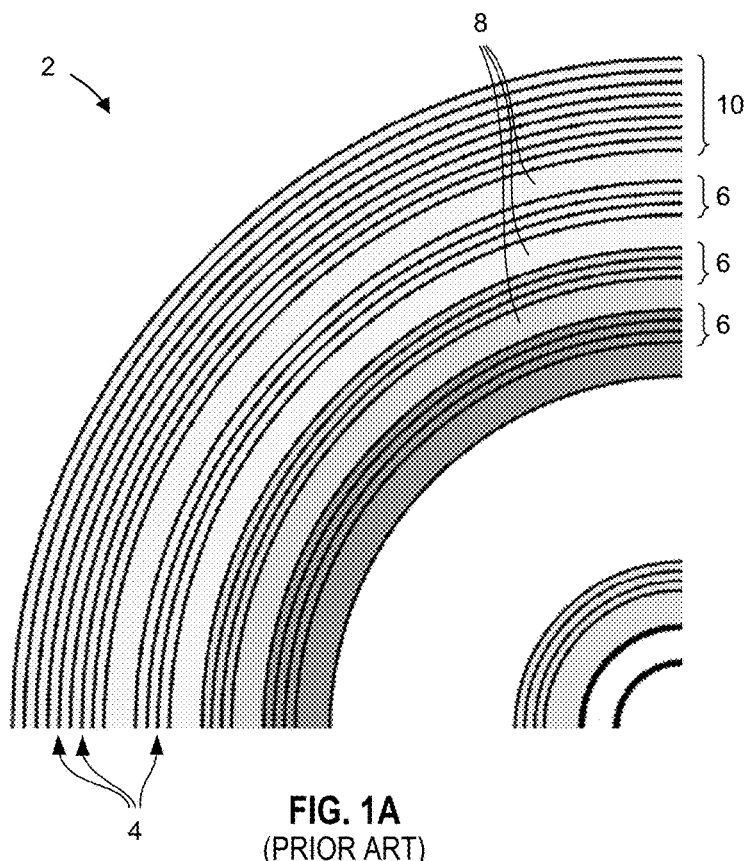
FIG. 1A is a top view of a portion of a SMR disk platter.
Figure 1B:
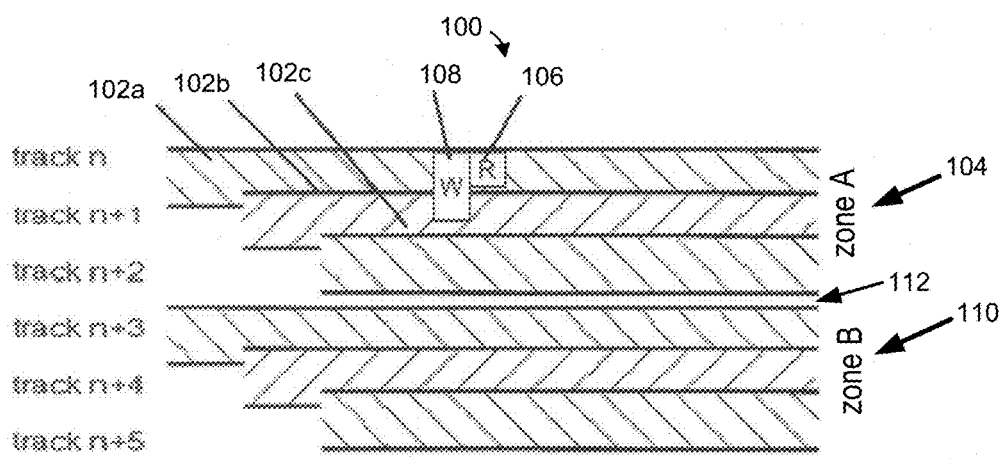
FIG. 1B is a top view of a portion of a platter of an SMR disk.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

SMR disks have a higher storage density compared to conventional non-overlapping disks, which makes SMR disks appealing for some applications. However, the sequential write requirements of SMR disks cause compatibility issues with file systems that support random write access. Accordingly, methods and systems that allow file systems supporting random access writes to utilize SMR disk drives are desirable.

In at least one aspect, the present disclosure is directed to methods and systems for making an SMR disk appear and operate with the same or similar random access characteristics of conventional hard drives even though the SMR disk has strict sequential write requirements. A layer of virtualization is added between a host file system and a logical address space of an SMR disk drive, where a logical address corresponds to a physical location on the SMR disk. The virtualization and various data management techniques may be used to make the SMR disk appear as a random access disk to the host file system.

In at least some embodiments, the host file system operates within a virtual address space and may accept random access write requests in the usual manner. The write requests may originate from an operating system or software application running on the host system. The write requests may be received at an SMR management system according to the present disclosure, which may comprise a virtual space manager and a logical space manager. The virtual space manager manages the virtual address space, which is the space visible to the operating system or applications, and maps virtual addresses to logical addresses on the SMR disk. In addition, the logical space manager controls the placement of data on the SMR disk and ensures that writes to the disk comply with the sequential write requirements of the SMR disk. The SMR management system may therefore allow the host file system to accept random access write requests while abiding by the SMR sequential write rules.

Some embodiments may be implemented partially or wholly in a storage adapter. As known to persons skilled in the art, a storage adapter may be used to connect a computing device, which may act as a host system, to one or more storage devices. A storage adapter may be referred to more generally as a host adapter. It is contemplated, however, that other embodiments may not be implemented in a storage adapter.

Figure 2:
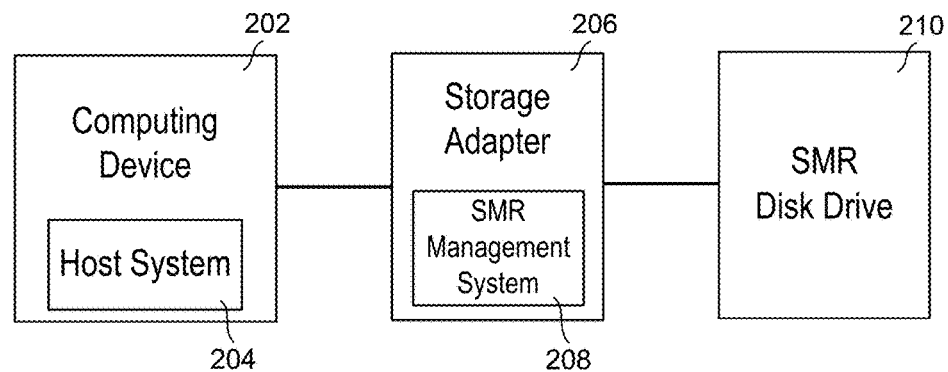
FIG. 2 is a block diagram showing an example apparatus comprising a storage adapter having a SMR management system in one embodiment according to the present disclosure.

FIG. 2 shows a block diagram showing an example apparatus comprising a storage adapter 206 having a SMR management system 208 according to the present disclosure. The storage adapter 206 may be disposed between and connected to a computing device 202 and an SMR disk drive 210. Computing device 202 may comprise a host computing system 204, which may manage a file system at the computing device 202. Part or all of the SMR management system 208 may be implemented on the storage adapter 206, which may serve as an interface between host system 204 and the SMR disk 210. The SMR management system 208 may make the SMR disk 210 appear to the host system 204 as a disk drive having random access characteristics.

In addition, an embodiment of SMR disk drive 210 has one or more platters, a disk controller, a memory, one or more write heads, and one or more read heads. The disk controller may include an electronic processor for controlling reads and writes to the disk as well as performing disk management tasks.

Although the embodiment of FIG. 2 is shown with the SMR management system 208 implemented on the storage adapter 206 separate from the SMR disk drive 210, this is not meant to be limiting. In other embodiments, the storage adapter 206 may be part of the SMR disk drive 210, part of the computing device 202, or some combination thereof. In other words, storage adapter 206 comprising SMR management system 208 according the present disclosure may be implemented in any suitable location or locations on any suitable device or devices.

Figure 3A:
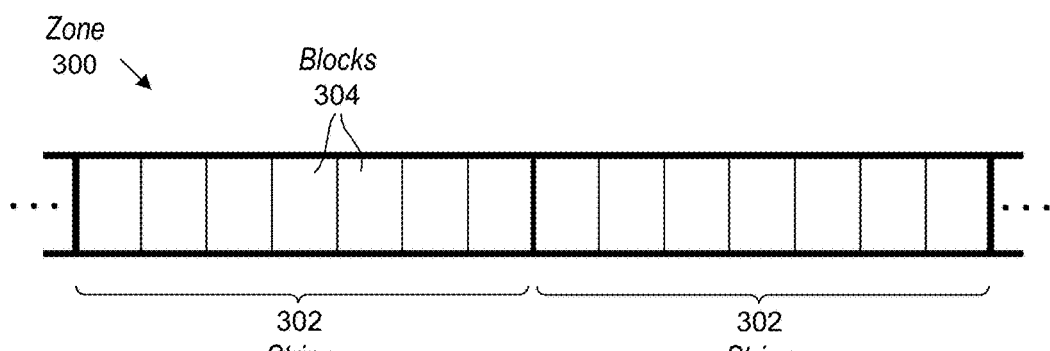
FIG. 3A is a representation of a portion of a zone on an SMR disk showing stripes and blocks.

In some embodiments, zones on the SMR disk are each subdivided into a plurality of stripes with each stripe comprising a plurality of blocks. Data may be written to the SMR disk in increments of stripes. The writing of data to a zone on an SMR disk may be performed in minimum increments of a stripe or any other suitable unit. FIG. 3A shows a representation of a portion of a zone 300 on an SMR disk to illustrate how a zone 300 may comprises a plurality of stripes 302 and each stripe may comprise a plurality of blocks 304. The number of blocks in a stripe may vary in different embodiments, as will be described below.

When the host file system receives a request to write data to a previously written block (or plurality of blocks), the write may not be performed as a write-in-place (e.g. merely rewrite to the same physical block on the disk) since this would violate the sequential write rules of the SMR disk. When a block located within a stripe is to be rewritten with new data, the entire stripe may be read from the SMR disk into a memory of the system, the stripe may be modified in the memory to replace the previous data stored in the block with the new data, and the modified stripe may be written to a new, next available stripe on the disk. This may be referred to as a copy-on-write. Copy on write may be defined as the process of reading any data (e.g. blocks) in a stripe not described in the current write request and writing the resulting full stripe to a new stripe location.

Figure 3B:
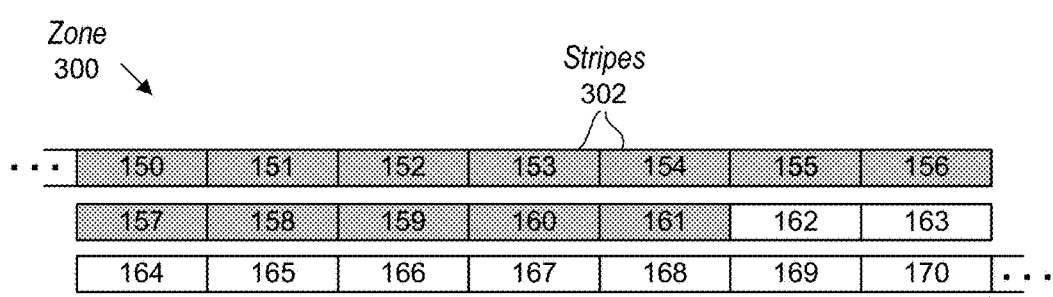
FIG. 3B is a representation of a portion of a zone on an SMR disk showing available and unavailable stripes.

FIG. 3B is a representation of a portion of a zone 300 on an SMR disk showing available and unavailable stripes. Unavailable stripes are stripes that have been written in the zone. In this example, stripes 150 to 161 are unavailable. Available stripes are stripes that have not yet been written in the zone. Stripes 162 to 170 are available. A next available stripe on an SMR disk is the next free stripe that can be written in compliance with the sequential write requirements of the disk. Thus when new data is to be written to the disk, the data is typically written to the next available stripe or stripes in a zone on the disk. In the example of FIG. 3B, the next available stripe is stripe 162.

In addition, the SMR management system 208 may update mapping data, referred to herein as metadata, which generally includes mappings of virtual addresses to logical addresses of the blocks written to the disk. The metadata may alternatively or additionally include mappings of the logical addresses to virtual addresses. In this way, the virtual address of a given block always remains the same to the host system while its underlying logical address and physical location on the disk may change. In some embodiments, the mappings in the metadata are on the granularity of a stripe, meaning a virtual stripe number or identifier is mapped to/from a logical stripe number or identifier.

A simplified example is explained with reference to FIG. 4, which shows a representation of a portion of an SMR disk having one or more zones comprising a plurality of stripes 302, 304, 322, 324 on the physical disk. Stripes 322 and 324 may be on the same zone or a different zone than stripes 302 and 304. The version of the stripes shown in the upper portion of FIG. 4 represents the disk prior to the writing of new data to the physical disk, while the version of the stripes shown in the lower portion of FIG. 4 represents the disk after the writing of new data.

Figure 4:
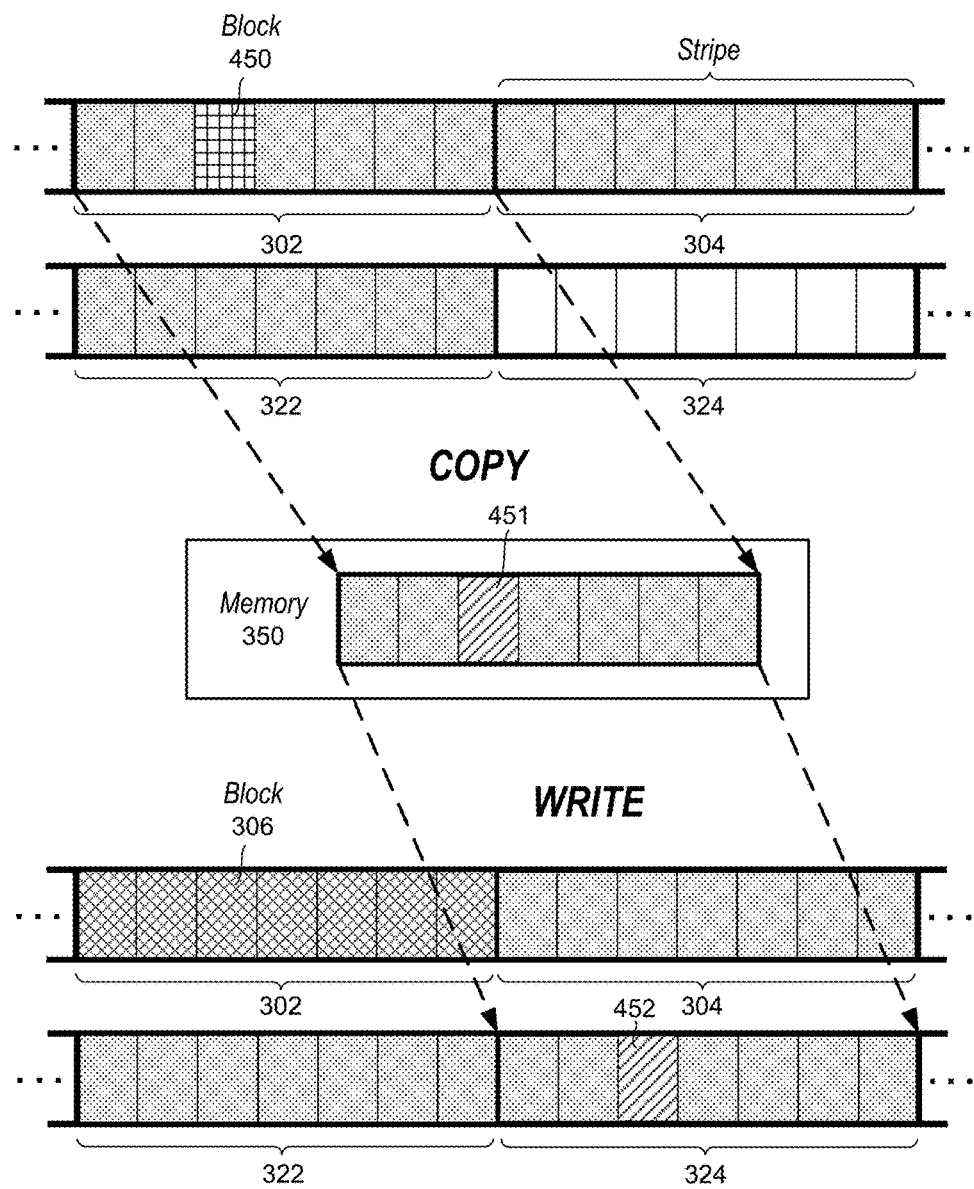
FIG. 4 is a representation of a portion of an SMR disk having one or more zones comprising a plurality of stripes.

In the upper portion of FIG. 4, the shading of the blocks in stripes 302, 304 and 322 represents that data has been previously written to these stripes and the stripes are still valid, meaning they each contain at least one block of valid data. On the other hand, the non-shading of stripe 324 represents that the stripe is available to be written.

In this example, a file system receives a request to rewrite block 450 with new data, which is located in stripe 302 on the disk. The request to rewrite block 450 uses the virtual block address of block 450. In a copy-on-write operation, stripe 302 is copied from the disk into a memory 350 of the system. The data previously stored in block 450 may then be replaced with the new data, as indicated by the different hatching of block 451 in the memory 350. The stripe is then written from the memory 350 back to the disk at a next available stripe on the disk, which in this example is stripe 324. The new logical address of the new data is the logical address of block 452 in stripe 324. In some situations, the contents of a stripe are not copied into memory 350. For example, when new data is to be written to an entire stripe, the new data may be simply written to the disk at the next available stripe on the disk. There is no need to copy data from the stripe on the disk since all of the data is being replaced with new data.

Accordingly, the virtual address of the block remains the same while the logical address of the block is changed to reflect the new physical location of the block on the disk. Metadata containing mapping data may be updated to reflect the new mapping from the same virtual address of the block to the new logical address of the block on the physical drive. The mappings for other valid blocks in the stripe may also be updated.

In addition, in some embodiments, the system may change a status of stripe 302 from valid to invalid indicating that stripe 302 does not contain any valid data, and therefore may be reclaimed. This is represented by the different hatching of stripe 302 in the lower portion of FIG. 4. Validity information may be stored in any suitable location by the SMR management system. This validity status of stripes may be stored in validity information by the system.

Figure 5:
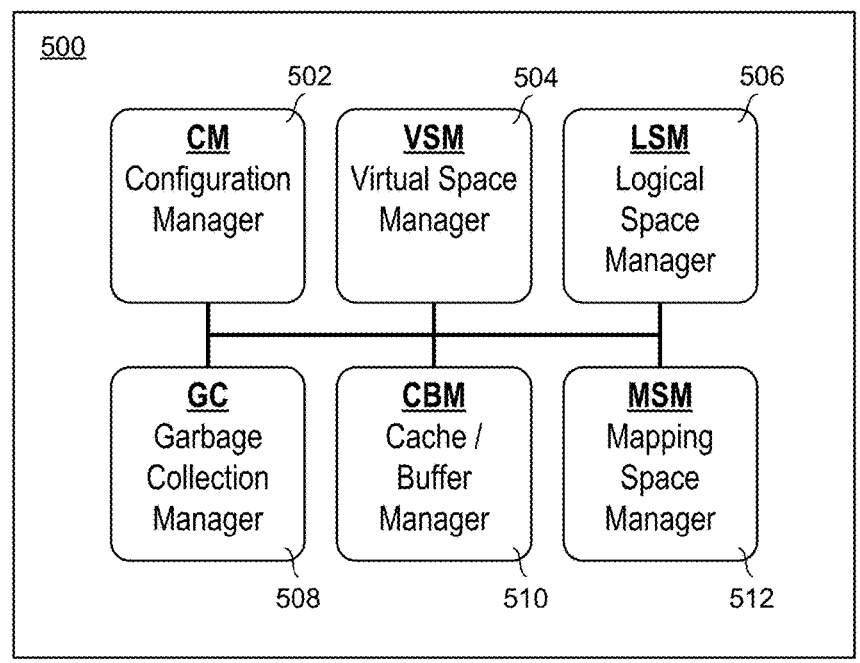
FIG. 5 is a block diagram representing an example SMR management system.

FIG. 5 is a block diagram representing an example SMR management system 500 according to an embodiment of the present disclosure. System 500 may comprise one or more of a configuration manager module (CM) 502, a virtual space manager module (VSM) 504, a logical space manager module (LSM) 506, a garbage collection manager module (GC) 508, a cache/buffer manager module (CBM) 510, and a mapping space manager module (MSM) 512.

In brief, the VSM 504 may manage the virtual to logical mappings so the logical address of each virtual block is known at all times. The LSM 506 may manage the distribution of data on the disk and may also support garbage collection operations. The GC 508 may acquire necessary resources for garbage collection and may marshal garbage collection operations. The MSM 512 may manage the metadata for the VSM and the LSM, as well as providing locking methods to ensure coherent operations on the metadata. The CM 502 may provide a caching resource to collect data and perform efficient writing of data to the disk.

The various modules of system 500 may cooperate, communicate and/or interact with one another, as represented by the lines joining the modules. Again, in some embodiments, one or more components of the system or the entire system may be contained in a storage adapter, as shown in FIG. 2. In addition, one or more of the modules may be implemented in software, hardware, firmware, or in some combination thereof.

Referring back to FIG. 5, the modules of SMR management system 500 are now each described in more detail. Virtual space manager module (VSM) 504 manages a virtual address space presented to a host file system on a computing device. The VSM 504 handles the mapping of all virtual addresses to logical addresses, where a logical address corresponds to where data is located on the SMR disk. In addition, the VSM 504 employs the mapping space manager module (MSM) 512 to access metadata of the system, which includes the current disk location for any block allocated on the disk.

A stripe on the disk comprises a range of block addresses. A stripe may have a size in the range of 64 kilobytes (KB) to 2 megabytes (MB), or any other suitable size. The size of a stripe has an inversely proportional effect on the amount of metadata necessary for mapping virtual addresses to logical addresses. In an embodiment, a mapping entry in a mapping table in the metadata may require 4 bytes of data within the VSM 504. If the mapping were performed on a block level granularity, the amount of metadata required for the mappings would be very large. Accordingly, in at least some embodiments, a stripe comprises multiple blocks, thereby reducing the ratio of metadata to storage capacity.

When a write involves writing to a number of blocks that is a multiple of the stripe size, the write operation may be broken down into multiple writes, each one stripe in size. In other words, when all blocks in a stripe are to be written, there is no need to read the blocks from the disk since every block in the stripe will be written with new data. In contrast, a write on a block range smaller than a stripe in size may be performed as a read, modify, write operation, which involves all the blocks of the stripe. Since no write in place is allowed on an SMR disk, all writes must go to a new physical address on the disk. The allocation of physical blocks on the disk to accommodate write operations is managed by the logical space manager module (LSM) 506, which is discussed further below.

The responsibility of the VSM 504 is to track the translation of the virtual address, the address supplied by an incoming request, and map it to the current logical address, which is provided by the logical space manager module (LSM) 506. The VSM 504 does this tracking via the mapping space manager module (MSM) 512. The VSM 504 may employ the resources of the MSM 512 to keep, in a persistent manner, all the current physical locations of each stripe written to the SMR disk.

In an example, the host file system receives a request to write data to a block having a virtual address. The VSM 504 may then determine in which virtual stripe the particular block is located, since an embodiment of the present SMR management system stores metadata for mapping virtual to logical addresses on a stripe by stripe basis (e.g. a virtual stripe is mapped to a logical stripe). Once the VSM 504 determines the particular virtual stripe in which the block is located, the virtual stripe number is used as a key to look-up in the metadata the logical stripe number that is currently allocated to store the virtual stripe. The logical stripe number indicates where the block is stored on the physical SMR disk. As with virtual addresses, a virtual stripe number has no bearing on where the data is actually placed on the SMR disk.

This may be further described with reference to an example. In an example embodiment, write requests may arrive in terms of block addresses and block counts where each block may have a size of 4 KB. When a request involves multiple blocks, the blocks may be broken down or separated on stripe boundaries, meaning the one or more stripes that the blocks span are identified. In at least one embodiment, the VSM 504 and the LSM 506 use a common stripe size. By maintaining a common definition as to the location and size of each stripe, the VSM 504 and LSM 506 may act in concert to move data in a consistent and coherent manner. In an embodiment, some math may be used to resolve the stripe numbers from virtual addresses by dividing the virtual block, or virtual block plus a block count, by the stripe size. The VSM 504 may then work on the one or more virtual stripe numbers. A virtual stripe number may be used as a key or index value into the VSM mapping table in the metadata to determine the logical stripe in which the blocks reside.

If the key yields a value of 'unmapped', then the write request may be the first write to this virtual stripe. On the other hand, if the key returns a value other than 'unmapped', then the returned value is the logical location where the blocks reside, which is known to the LSM 506.

In an illustrative example, a stripe size is 256 KB and a block size is 4 KB, meaning there are 64 blocks per stripe. A request arrives to write 16 blocks starting at block 56. This request spans two stripes, namely blocks 56-63 on virtual stripe 0 and blocks 0-7 on virtual stripe 1. The VSM 504 requests two stripes from the LSM 506 to write the data in these 16 blocks. The LSM 506 responds with, for example, logical stripes 21 and 22. The VSM 504 may record these logical stripe numbers in the VSM mapping table in the metadata so that subsequent read and write requests using virtual addresses are directed to the proper logical stripe locations. The block and stripe numbers used in this paragraph are only examples.

Logical space manager module (LSM) 506 controls the placement of data on the physical disk and may also manage the Logical Block Address (LBA) space of the disk. Since write-in-place is generally not allowed on the SMR disk, the LSM 506 is responsible for making write operations copy-on-write. In addition, the LSM 506 may act in conjunction with the virtual space manager module (VSM) 504 to handle initial writes as well as updates to previously written data.

In some embodiments, the LSM 506 places data on the disk in a first fit manner. The LSM 506 may use the disk as a large circular buffer, filling in each stripe with blocks before moving onto the next available stripe. Once a zone is filled, the LSM 506 may close the zone and move to the next available zone.

The LSM 506 may continue performing sequential writes in this manner. In an illustrative example, the host file system may write virtual stripe numbers 18, 35, 100, 200, 1, 23, 27, and 5000. The allocation of the virtual stripes to new logical stripes may be, for example, 18: stripe 0, 35: stripe 1, 100: stripe 2, 200: stripe 3, 1: stripe 4, 23: stripe 5, 27: stripe 6, 5000: stripe 7, and so on. Accordingly, regardless of the incoming virtual stripe number, a virtual stripe is assigned to the next available logical stripe. This may be referred to as a "first fit" method.

In an embodiment, a difference between an initial write to a virtual stripe address and an update to a virtual stripe address is whether the VSM mapping table in the metadata does, or does not, have a current mapping for the virtual address. An initial write to a virtual stripe will have no metadata storing a corresponding logical address of the virtual stripe. On the other hand, an update to a virtual stripe will generally have a valid mapping of the virtual stripe to a logical stripe. For initial writes, the LSM 506 may merely supply an available logical stripe for the stripe to be written. In the case of updates, the LSM 506 may provide an available logical stripe for the stripe to be written, and may also invalidate the previous logical stripe where the data was stored. The invalidation of a previous logical stripe when data is rewritten to a new logical stripe was discussed above in relation to FIG. 4.

The tracking of valid and invalid logical stripes in at least some embodiments is now further described.

The LSM 506 may employ the MSM 512 to handle a backwards mapping of logical addresses to virtual addresses. The LSM 506 may do this to support rewrite operations. In a rewrite operation, an existing logical stripe on the disk is written to a new logical stripe. Accordingly, the logical address of the "old" stripe is now invalid in the sense that it is no longer used and thus may be reclaimed. However, the old stripe cannot be rewritten until its entire zone is reclaimed. In some embodiments, a zone is reclaimed when the write pointer of the zone is reset. Accordingly, until the zone of the old stripe is reclaimed, the LSM 506 may track whether every stripe within the zone is valid or invalid. The tracking of the stripes with a given zone may allow the LSM 506 to identify when the zone becomes depleted beyond a threshold value. A zone may be depleted once it is completely populated with invalid stripes or has a specific percentage (e.g. a high percentage) of invalid stripes. The threshold value may be different in different embodiments. For example, the threshold value may be set at 50%, 25%, or any other suitable value. Once a zone is depleted, meaning the number or percentage of invalid stripes has reached or exceeded a threshold value, the LSM 506 may move any remaining valid stripes to a new zone (e.g. a migration zone) so that the previous zone may be reclaimed. This may form part of garbage collection operations, which are discussed in more detail below.

Figure 6:
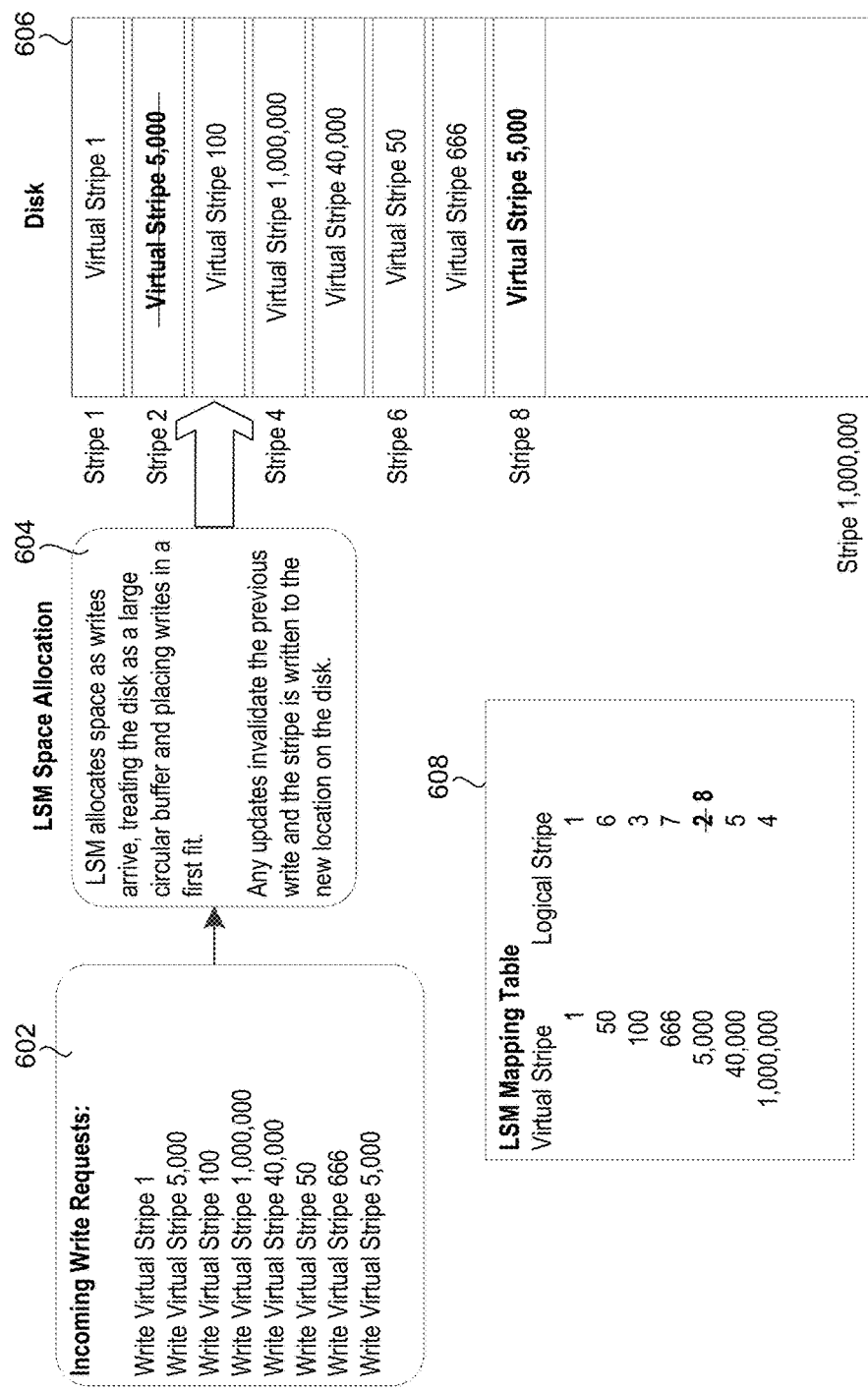
FIG. 6 is a diagram with example write operations showing virtual and logical addresses.

FIG. 6 shows a diagram with example write operations showing virtual and logical addresses. Incoming write requests received by a host file system are shown in block 602. The write requests may be received using virtual block addresses. The virtual block addresses may be used by the VSM 504 (shown in FIG. 5) to determine the virtual stripe addresses in which the virtual blocks are located, as previously described. The LSM 506 allocates space, for example stripes, in the logical address space to store the data on the disk as shown in block 604. The placement of logical stripes written to the disk is shown in block 606, where the stripes are labeled with their corresponding virtual stripe number. The logical stripe numbers are indicated on the left side of block 606 starting at logical stripe 0 and ending at logical stripe 1,000,000. In this example, before the first write, there were no stripes allocated on the disk.

It is shown in FIG. 6 how stripes may be written to a disk in a first fit manner, wherein writes are written in a next available logical stripe on the disk. For example, the first write request to virtual stripe 1 is written in the first available logical stripe, which in this example is logical stripe 0. The next write request to virtual stripe 5,000 is written to logical stripe 1, and so on. As data is written to logical stripes on the disk, the LSM mapping information for mapping logical stripes to virtual stripes may be updated. This example shows metadata in the form of an LSM mapping table 608.

The example also shows the rewriting (e.g. updating) of data in virtual stripe 5,000. The full stripe may be written to a next available logical stripe on the disk, which here is logical stripe 8, and the previous logical stripe (logical stripe 2) may be invalidated, as shown. In addition, the LSM mapping table 608 shows the updating of the LSM mapping information in the metadata in response to the rewrite of virtual stripe 5,000, namely updating the previous logical stripe number (stripe 2) to the new logical stripe number (stripe 8) at which virtual stripe 5,000 is now located on the disk.

In some embodiments, the LSM 506 maintains validity information for zones on the disk indicating whether each stripe within a zone is valid or invalid for possible use in garbage collection operations. The validity information may include zone density mapping, or alternatively zone density information may be determinable from the validity information. Zone density refers to the percentage of valid stripes relative to the total number of stripes in a zone. An allocation of a new stripe in a zone increases the density of the zone, while an invalidation of a stripe in response to a rewrite operation decreases the density of the zone. The validity information of zones on the disk may permit the LSM 506 to perform or trigger garbage collect operations to reclaim zones for future use.

Referring again to FIG. 5, the garbage collection manager module (GC) 508 may be the module responsible for moving valid stripes in depleted zones to new zones (e.g. migration zones) in order to free up zones. In some embodiments, the LSM 506 may lack the transaction resources to independently manage garbage collection operations and so may employ the garbage collection manager module (GC) 508 to handle the garbage collection operations. The LSM 506 may interact with GC 508 to cause garbage collection operations to be performed.

In an embodiment, the garbage collection manager module (GC) 508 acquires necessary resources for garbage collection. The GC 508 uses the same resources used for any input/output (I/O) operation, namely memory and I/O process descriptors. These may be resources of the storage adapter and are doled out to various transaction control points such as the GC 508 or the cache buffer manager module (CBM) 510 to marshal data between the memory and the SMR disk. The SMR management system 500 may comprise a resource management module that allocates resources. This module keeps track of the resources allowed and consumed by the various modules of the SMR management system 500 and ensures that all of the modules advance their work even when all resources are under heavy use.

In an embodiment, memory resources exist as a pool of buffers that transaction controllers request and return. 10 descriptors are structures used to describe the I/O operation to do, and may include the address of the SMR disk, the block address and block count on the disk, the location of the memory buffers to use, the type of access (read or write) to be done, etc.

As described above, the LSM 506 may maintain validity information for zones on the disk indicating whether each stripe within a zone is valid or invalid for use in garbage collection. When a zone becomes depleted, meaning once the zone is completely populated with invalid stripes or the zone has reached a specific percentage (e.g. a high percentage) of invalid stripes, the invalidated stripes are no longer storing valid data (e.g. the stripes are no longer being used) but the invalid stripes may not be written with new data until the entire zone is reclaimed. In an SMR disk, reclaiming a zone may require resetting the write pointer of the zone to the start of the zone (e.g. the lead block in the zone).

In order to reclaim the space occupied by invalid stripes within a zone, the remaining valid stripes in the zone, if any, may be moved to another zone. The entire space occupied by the zone may then be reclaimed. In this regard, the LSM 506 may cause the GC 508 to move one or more valid stripes from a zone that is to be reclaimed to another zone. The GC 508 may manage the moving of the stripes while the LSM 506 may handle the actual data placement on the disk. For example, the GC 508 may formulate the requests to write stripes while the LSM 506 decides exactly where to write the stripes. The GC 508 may work in concert with the VSM 504 and the LSM 506 to empty out zones so that the LSM 506 may reclaim and reuse the zones.

In working with the GC 508, the LSM 506 may maintain on or more separate pools of stripes for allocation of space on the disk. In an embodiment, the LSM 506 maintains two pools. A first pool may be an active write pool. The LSM 506 may allocate space for write requests received by the host file system. A second pool may be a migration pool from which the LSM 506 draws stripes when the GC 508 requests space for writes in garbage collection operations. The stripes in the first pool may belong to zones used for active writes, while stripes in the second pool may belong to zones used for writing data in garbage collection operations. Stripes written to active zones may have a higher probability of being rewritten compared to stripes written to migration zones since stripes written to migration zones represent valid stripes remaining in a zone, meaning they have gone a longer period of time without having been rewritten.

In an embodiment, the second pool for migration is used by the LSM 506 to bring together valid stripes from multiple depleted zones and condense those stripes into a smaller number of zones. This may have the effect of freeing up multiple zones for write operations and also decreasing fragmentation on the disk. Additionally or alternatively, it may have the effect of collecting cold data together, which may make for an efficient use of storage space. The collecting of cold data together in one or more zones generally decreases the probability that data within the zones will be overwritten in the near future. This can reduce the chance that the cold data is repeatedly migrated from zone to zone in garbage collection operations.

Once again referring to FIG. 5, the cache buffer manager module (CBM) 510 may buffer data to be written in a new stripe in an attempt to build up, as much as possible, full stripes for write operations. Thus data may be temporarily buffered in the cache of the CBM 510 rather than being written to the SMR right away. In this regard, the CBM 510 serves as a buffering manager for the VSM 504. Since in some embodiments data is written to the disk in increments of a stripe, an attempt to coalesce blocks to be written into the fullest stripes possible may provide improved efficiency and utilization of the space on the disk.

In some embodiments, the CBM 510 may serve as a write back cache since the CBM 510 may report the completion of a write to the host (e.g. the host file system, an application on the host, etc.) before the write is actually completed on the SMR disk.

The CBM 510 may be implemented on any block oriented, random access, and persistent storage device. This may be a conventional zone of an SMR disk, another area on the SMR disk, space on a higher speed intermediate storage, such as a solid state drive (SSD), a random access memory (RAM) disk created from the memory resources of the storage adapter itself, a collection of buffers composed of memory resources of the storage adapter, or any other suitable storage device. Therefore although the CBM 510 may be part of the SMR management system 500 of the present disclosure, and FIG. 2 shows the SMR management system 500 being located at storage adapter 206, some parts of the system 500 may be located off of a storage adapter 206.

There may be a few considerations in designing the CBM 510. Each cache descriptor requires a particular number of bytes. Therefore to maintain each descriptor as a memory reference only, the size of the cache may be made small so that paging of cache descriptors is not necessary. On the other hand, a larger cache means a greater likelihood of capturing and collecting partial writes to reduce the amount of invalidations. Generally, the larger the cache, the longer data can remain in the cache without aging-out and being flushed (e.g. being evicted from the cache and written to the disk), and therefore the greater the likelihood that updates change only the memory image and do not result in additional disk write activity. The design of the CBM 510 in terms of a cache may be based on these considerations, and may vary depending on the implementation.

In an embodiment having two or more SMR disks, the space for the CBM 510 may be segmented so that the metadata of a particular drive instance is kept with that drive instance. In another embodiment, the space for the CBM 510 may be consolidated on a single SMR disk.

Again referring to FIG. 5, the MSM 512 generally supports the work of the VSM 504 and the LSM 506 by providing resources to manage the associated metadata, such as the VSM mapping table and the LSM mapping table. The total size of the metadata may be large and may even exceed the amount of memory available on the storage adapter. In an example embodiment, each virtual stripe number and logical stripe number are 32 bits in length. The virtual address space may thus be 16 GB in size and the storage adapter may not have that much available memory.

Accordingly, in an embodiment, some paging of data may be used to accommodate the size of the metadata. In an embodiment, data may be paged onto the SMR disk. In some embodiments, the data is paged onto a conventional zone of the SMR disk. In some embodiments, paged data may be stored in any number of secondary storage devices including but not limited to the SMR disk, a RAM disk on the storage adapter, and a SSD or a set of SSD disks. Furthermore, paged data may be stored in a non-redundant manner or in a redundant manner. The MSM 512 may control the paging and presentation of the metadata for use by the VSM 504 and the LSM 506.

Furthermore, in an embodiment, the MSM 512 uses locking methods to ensure coherent operations on the metadata. Multiple processes or entities may make use of the mapping metadata and therefore there may be concurrent requests to change it. As such, locking methods ensure that requests are serialized and the metadata is not corrupted.

Again referring to FIG. 5, in at least one embodiment, the CM 502 controls the description of one or more SMR device to allow one or more runtime managers to traffic data to and from the SMR disks. A role of the CM 502 may be to allocate space on some storage device as persistent storage employed by the MSM 512. The MSM 512 may use the allocated persistent storage to track write allocations against the one or more virtual disks associated with the one or more SMR disks.

In some embodiments, the CM 502 allows for the persistent data to be placed on a conventional zone of each SMR disk, or aggregated and stored on a RAM disk created from the persistent memory resources of a storage adapter. The paging is done from a persistent memory resource so that data is correct whether the data is in memory or on a disk, or managed with some portion in each facility. In an embodiment, the persistent data may be kept exclusively on the disk where each change must be written before allowed to proceed. In another embodiment, persistent memory is used to store the persistent data to avoid the delay associated with writes to disk. In an embodiment, resources at each level (e.g. resources allocated to the various modules) work in concert to maintain a correct and coherent mapping, and the resources provided at each level meet the requirements for persistence of data and atomic updates. The CM 502 allocates or partitions the resources of persistent memory for the storage of the mapping metadata. While in some embodiments, the resources of persistent memory may be either a conventional zone of the SMR disks or an adapter supplied RAM disk, the mapping metadata may be placed on any block or pseudo-block device that supports random access.

In an embodiment, the various modules of SMR management system 500 maintain information persistently. Descriptors are used by the modules to describe the nature of the information or operations. For example, the VSM 504 maintains a persistent mapping of virtual locations to logical locations. The LSM 506 maintains a persistent mapping of logical locations and the virtual locations stored therein. The cache of the CBM 510 maintains a list of all acknowledged writes that have not yet made it to the disks. The exact nature of the information is dependent upon the owner or 'level' of operation being described.

As previously mentioned, some embodiments may comprise two or more SMR disks. The term single drive instance (SDI) is defined herein to be the presentation of one virtual drive for each SMR disk in the system. This one to one mapping provides a presentation of SMR disks to the host system consistent with current expectations, namely that each disk is managed as a separate device and a failure of that device does not affect the correct operation of any other device. While this presentation may sometimes be less than optimal for effective and efficient use of SMR disk resources, SDI addresses a need to provide SMR based resources in a manner to meet expectations of many applications.

In some embodiments, the operations for SDI comprises a set of modules, such as one or more of those shown in FIG. 5, that make it possible to operate SMR disks as SDIs and present them to the host system for use without modification to host software. While SDI may be a presentation of SMR disks resources to the host system, the methods used to achieve this presentation are not necessarily limited to just SDIs. In some embodiments, the methods allow the collection of drives into pools to provide for a definition of larger disks and improvements in space management. This pooling additionally can be augmented with erasure codes to improve reliability and availability.

An aspect of the configuration for SDI is the ordering of the SMR disks. In an embodiment, a rule of the configuration is the order of presentation is to remain until user action occurs. This simply means that it will require an action of adding or removing one or more disks to cause the order of presentation to be altered. It does not mean that all devices listed are usable, rather that the order remains constant, barring user interaction. To support this, the configuration may be in the form of "instance i of n." For example, an SDI could be instance 5 of 15. This means the SMR disk, as presented, will be index 5 and the total reported set of virtual disks will be 15. This may allow the host system to have a known relationship of virtual disk to incorporation persist until some point of user intervention or reconfiguration.

In practice, the "of n" may translate to the creation of a list of 'n' virtual disks each of which may report as existing but will fail all operations. As SMR disks are discovered, the entries in the list will be overwritten with the particulars of each virtual disk. A healthy system may replace each and every failed disk entry with one for a working SDI.

This may be done to support mappings that might be affected by alterations of the reported bus/target/logical unit number (LUN) nexus. An LUN is a number used to identify a logical unit, which is a device addressed by a storage protocol. Since that tuple may be highly sensitive to the order of discovery, this provides the configuration with consistent reporting of device entries.

Accordingly, in some embodiments, the CM 502 deals with two primary tasks. One task is the allocation of space and placement of metadata for the SDI, which may be mostly contained with the SDI implementation. Another task is the label information used to control the order of presentation of multiple disks, which may be subject to rules of label management of functional environment—the firmware initialization and re-initialization of device instances.

In summary, the various modules of the SMR management system 500, including those described herein with reference to FIG. 5, may cooperate to allow the presentation of a virtual device implemented using an SMR disk to a host system. The SMR disk appears and operates with the same or similar random access characteristics of conventional hard drives, albeit at a potentially lower input output operations per second (IOPS) rate.

The host system may deal with the virtual disk with the same block operations methods as it does for HDDs and SSDs. In some embodiments, the virtual SMR disk is a true block device and therefore supports the application programming interfaces (APIs) expected of block devices. No alteration of host software may be needed to employ the SMR disk. This may extend beyond the operating system environment to include application spaces such as Ceph, Hadoop and OpenStack Swift.

Figure 7:
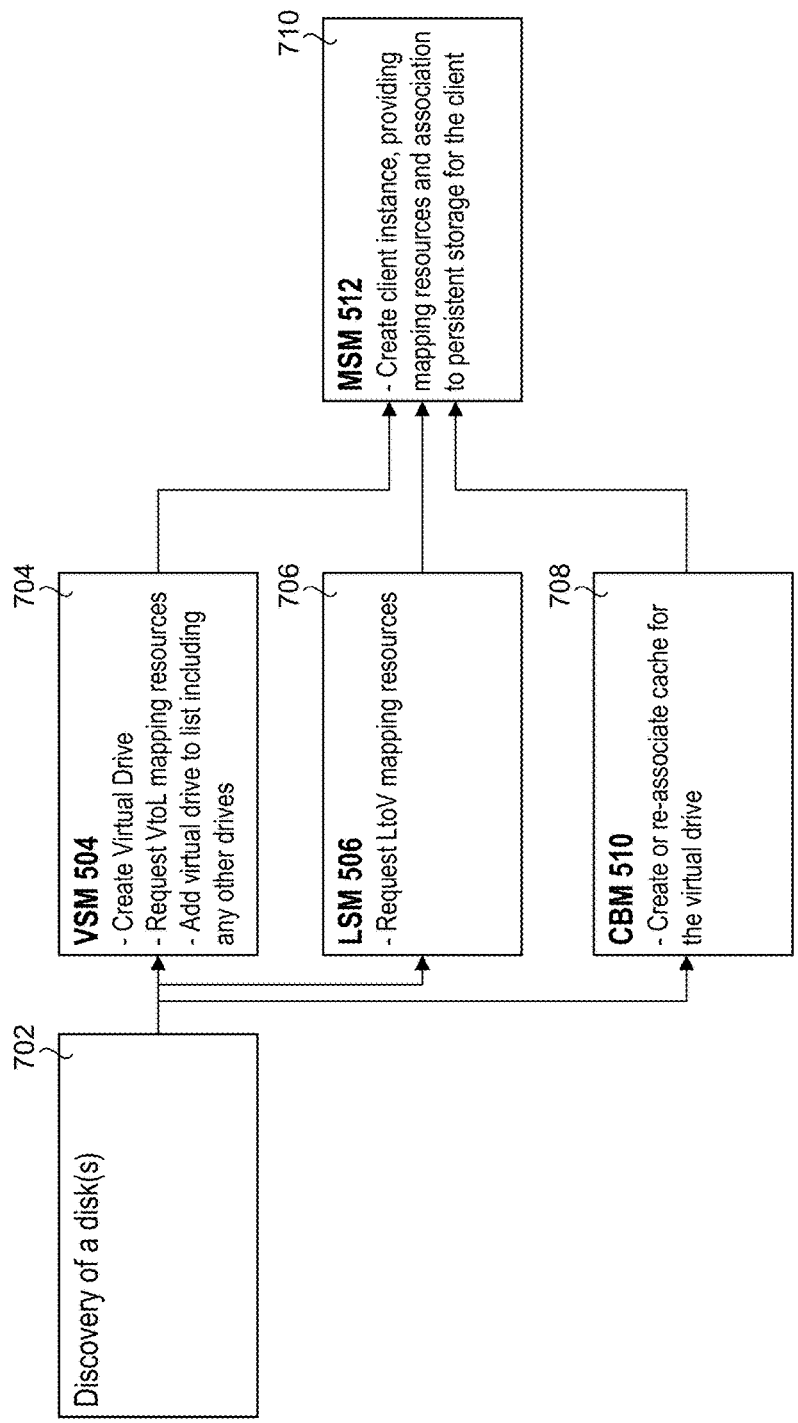
FIG. 7 is a diagram showing steps in an initialization process in an embodiment.

FIG. 7 is a diagram showing steps in an initialization process in an embodiment of an SMR management system according to the present disclosure. Initialization is the discovery of one or more SMR disks, and the invocation of the initialization routines that are to manage the disks. As the one or more disks are discovered, each may be presented to the VSM 504, the LSM 506, and the CBM 510 for management. These modules may in turn make use of other resources to incorporate, validate and present the discovered SMR disk for use by a host file system.

The example initialization process of FIG. 7 is now described in further detail. The discovery of one or more SMR disks may be performed at block 702. This may involve examining the label of the SMR disk to determine a mapping space location and size for the disk. Once the disk has been discovered, the disk is presented to one or more of the VSM 504, the LSM 506, and the CBM 510 for management, as shown in blocks 704, 706, and 708 respectively.

Block 704 shows some initialization operations at the VSM 504, which may include creating a virtual drive instance, requesting memory resources for virtual to logical stripe mapping metadata such as a VSM mapping table, and adding the virtual drive to a list of any other virtual drives to be presented to the host system. Block 706 represents initialization at the LSM 506, which may comprise requesting memory resources for logical to virtual stripe mapping metadata, such as a LSM mapping table. Block 708 represents initialization at the CBM 510, which may comprise creating or re-associating cache for the virtual instance of the disk.

One or more of the VSM 504, the LSM 506, and the CBM 510 may then communicate with MSM 512 to cause further initialization operations to be performed. Block 710 represents initialization at the MSM 512, which may include creating a client instance, and providing memory resources for mapping metadata and association to persistent storage for the client. In an embodiment, mapping clients are the VSM 504, the LSM 506 and the CBM 510, which each make use of the MSM 512. Each may therefore be provided with a unique instance so that per-client resources are identified. The association information includes the location on a disk where the mapping metadata is stored. Each client may be assigned a defined area for storage. For example, when a VSM 504 client begins communicating with a MSM 512, the MSM 512 provides the same context handle as may have been previously provided. The use of the same context handle may provide consistent mapping across multiple sessions.

A session is the period of time between restarts of a storage adapter or other device in which the SMR management system 500 is implemented. A session may be gracefully terminated when the storage adapter performs an orderly shutdown. A session may be abnormally terminated if something like an unexpected power loss occurs.

During a graceful termination, the SMR management system 500 completes all outstanding work and marshals all data to long term storage. However, allowances for unexpected shutdowns may be made as well. Upon restart of the storage adapter (the beginning of a new session), the SMR management system 500 looks for any outstanding work and completes the work before the storage adapter presents itself as ready for service. In contrast, after a graceful shutdown, there is no work to complete. In either case though, once any outstanding work is completed after startup, the storage adapter is ready for service.

Runtime in an embodiment of an SMR management system according to the present disclosure is now described.

One or more of the modules of an SMR management system according to the present disclosure may be state machines that have no tasking context of their own, such as the VSM and LSM. On the other hand, some modules may not be state machines and thus may not have any tasking content, such as a CBM flush task. A flush task may involve taking the oldest data in the cache buffer and evicting the data to the disk to make room for newer data in the cache. This is sometimes referred to as a "least recently used" policy.

In some embodiments, modules that are state machines are not allowed to block at runtime. Since modules that are state machines have no task context, blocking may cause possible problems for the task using the resources of the VSM and LSM. The state machine modules may be allowed to wait but they are not allowed to block. Resource allocation may be done within the tasking context to ensure that deadlocks are avoided. Tasks generally provide a context and order of operations. In an embodiment, the VSM 504 and LSM 506 are state machines and therefore operate under the provisions of the task in which they are instantiated. In other words, they are the code and not the data. For example, a write flush operation and the GC 508 use the common LSM 506 state machine to write stripes. Therefore, in essence, two instances of the same state machine may be executed concurrently. Without proper controls, it may be possible for the write flush and the GC 508 to write to the same stripe. Methods of blocking and resource protection may be used to ensure that events are serialized so that such events do not occur.

Figure 8:
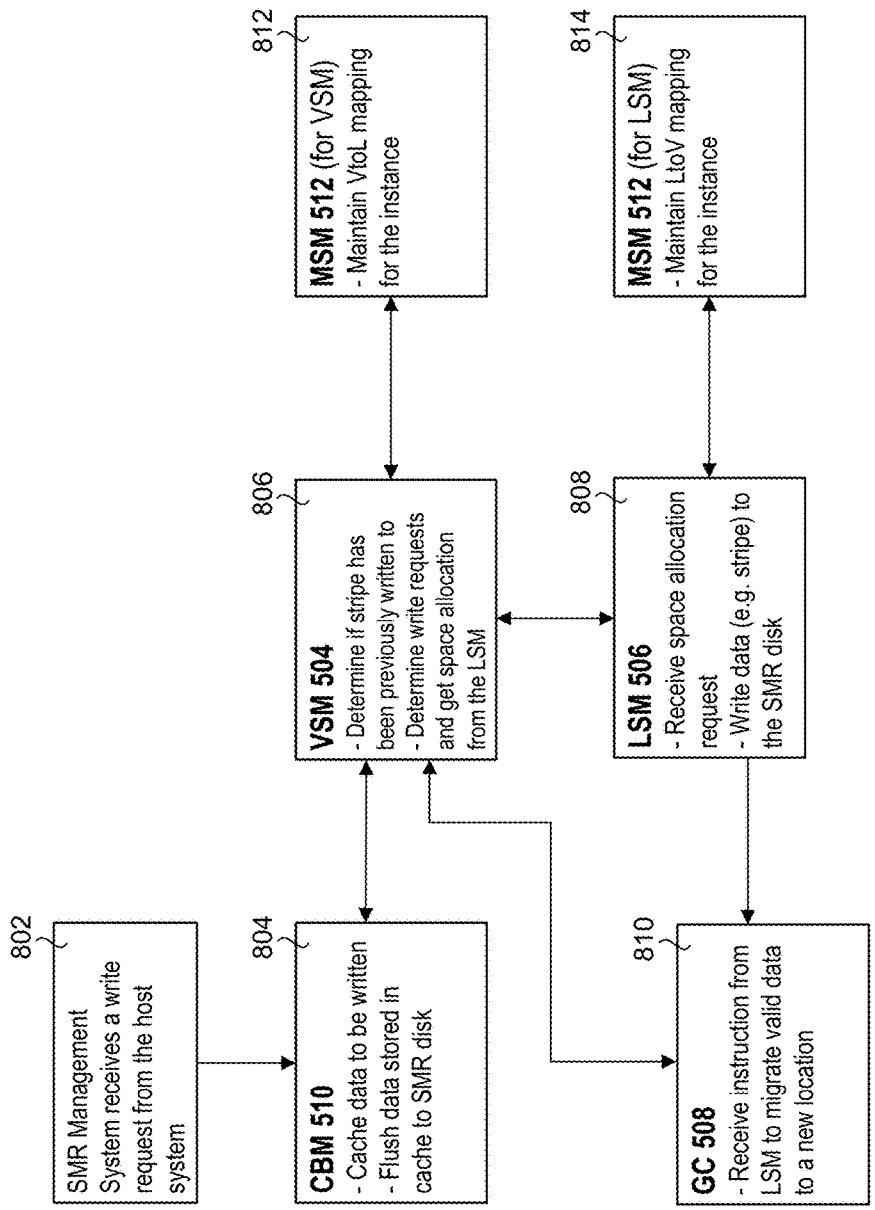
FIG. 8 is a diagram showing steps during runtime in an embodiment.

FIG. 8 is a diagram showing steps during runtime in an embodiment of an SMR management system according to the present disclosure. At block 802, the SMR management system may receive a request to write one or more blocks starting at some virtual block address. The request is resolved by the VSM 504 to one or more of virtual stripes in which the virtual blocks are located, and some, or all blocks within those stripes.

At block 804, CBM 510 records the stripe numbers, and affected block numbers within the stripe, in the cache. The host system is sent an acknowledgement that the write is complete. As previously described in relation to CBM 510, the CBM 510 may buffer data to be written into a new stripe in its cache in an attempt to build up, as much as possible, full stripes for write operations. At a later time, the blocks containing data to be written to the SMR disk stored in the cache may be flushed (e.g. written) asynchronously to the SMR disk.

At block 806, when data stored in the cache of the CBM 510 is to be written to the disk, for example when the buffer contains enough blocks to fill a whole stripe or based on some other triggering condition or time, the VSM 504 receives the write request for the virtual stripe for all affected blocks.

At block 812, the VSM 504 employs the MSM 512 to access VSM metadata to determine if the stripe has previously been written to the disk. This may involve performing a look-up in the virtual to logical mapping table. If the stripe has been previously written to the disk, the current stripe data stored on the SMR disk is read from the disk.

Back at block 806, the VSM 504 then proceeds with the write operation. The VSM 504 requests the LSM 506 to write the stripe. The VSM 504 does not know where the LSM 506 will actually write the data of the stripe on the disk.

At block 808, the LSM 506 finds the next available stripe on the SMR disk and writes the data to this stripe.

At block 814, the LSM 506 utilizes the MSM 512 to record the virtual stripe number in association with a logical stripe number corresponding to the location on the disk where the new stripe is written. The virtual stripe number may be stored in the LSM metadata in the logical to virtual mapping table.

Back at block 808, the LSM 506 replies to the VSM 504 with the logical stripe number used to store the virtual stripe. At block 806, the VSM may then employ the MSM 512 to record this information in the VSM metadata, for example in the virtual to logical stripe mapping table. The write operation may then be complete.

It is possible that a garbage collection process may be triggered, for example when a zone on the SMR disk reaches a threshold number or percentage of invalid stripes and is thus depleted. In addition, garbage collection may be triggered based on the activity of the disk. For example, if the disk is idle for a predetermined period, garbage collection may be triggered. If so, at block 806, the LSM 506 requests the GC 508 to move the valid stripes remaining in the depleted zone to a new available zone (e.g. a migration zone). The write operation in a garbage collection process may be performed in almost the same way as a write request from the host. A difference may be that the garbage collection write is known to be a migration write, therefore the LSM 506 writes the data in a migration zone rather than in an active write zone. A further difference is that the GC 508 makes the write request to the VSM 504 at block 806 (as indicated by the arrowhead pointing toward block 806 from block 810) rather than the host system. Otherwise, the updates to the VSM 504 and LSM 506 may be performed in the same way as for a host write.

At block 810, the GC 508 copies the valid data from the depleted zone to the migration zone, and may inform the LSM 506 of the status of the operations.

At block 808, the LSM 506 may utilize the MSM 512 to update the LSM metadata to reflect the new logical location (e.g. stripe numbers) of the moved data. In addition, the LSM 506 may forward the new logical location for the moved virtual stripes to the VSM 504. At block 806, the VSM 504 may then update its VSM metadata to reflect the new logical location using the MSM 512. In this manner, the VSM and LSM mappings are kept consistent.

Accordingly, in the embodiment of FIG. 8, at block 806, the VSM 504 receives input from two locations, namely from block 804 (CBM 510) and from block 810 (GC 508). The VSM 806 has different functions called from the CBM 510 and from the GC 508. These entry points into the VSM 504 uniquely identify where a reply by the VSM 504 is to be sent. A reply by the VSM 504 notifies the requesting entity (e.g. CBM 510 or GC 508) that the write has been completed. For example, the VSM 504 may reply to CBM 510 at block 804 or to GC 508 at block 810, as indicated by the arrowheads on the lines connecting boxes 806 and 804, and 806 and 810, respectively. By virtue of calling a specific entry point, the VSM 504 records exactly to whom the reply should be sent. No ambiguity exists and therefore the state machines remain deterministic.

Figure 9:
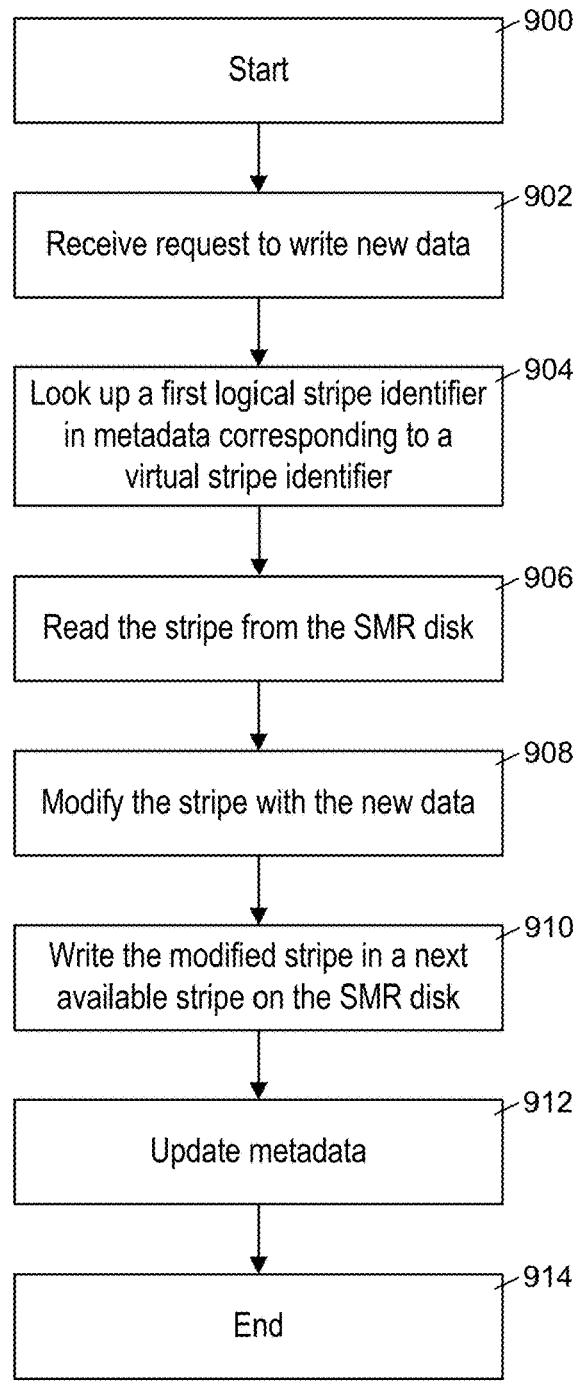
FIG. 9 is an example process for handling random access writing in a data storage system comprising an SMR disk.

An example process for handling random access writing in a data storage system comprising an SMR disk is shown in FIG. 9. The process begins at block 900 and proceeds to block 902, where a request is received to write new data to one or more blocks having each having a virtual block address. The SMR disk may be configured to write data into a plurality of zones subdivided into a plurality of stripes, and where each stripe is subdivided into a plurality of blocks. Data written within each zone may be written sequentially.

The process then proceeds to block 904, where a first logical stripe identifier is looked up in metadata corresponding to a virtual stripe identifier associated with the virtual block address. The metadata is obtained from the MSM 512, which may page out other data in order to make the needed metadata memory resident.

The process then proceeds to block 906, where the SMR disk is controlled to read the stripe corresponding to the first logical stripe identifier. The stripe may be stored temporarily in a memory of the system.

The process then proceeds to block 908, where data in the stripe that was read from the disk is modified by replacing previous data in the block with the new data.

The process then proceeds to block 910, where the SMR disk may be controlled to write the modified data of the stripe in a next available stripe on the SMR disk.

The process then proceeds to block 912, where the metadata may be updated to replace the mapping of the virtual stripe identifier from the first logical stripe identifier to a second logical stripe identifier corresponding to the location of the next available stripe on the SMR disk in which the modified data is written.

The process then proceeds to block 914 and ends.

Although example methods and processes are described herein with particular steps performed in a particular order, it is contemplated that other processes may have fewer or more steps, or different steps. It is also contemplated that some processes may perform two or more the steps in a different order.

An SMR disk used in or with embodiments of the present disclosure will not necessarily have the same performance characteristics (e.g. IOPS) of conventional random access write hard drives, but the SMR disk may advantageously allow for the same breadth of operations. Applications where the percentage of updates is very low and access is dominated by large sequential operations may generally be SMR-friendly and least likely to see any significant performance problems in adoption. Cold storage is characterized, in the write path, with highly sequential, large block operations and very little rewrite of any block address. Therefore embodiments of the present disclosure may be well-suited for these types of "cold store" applications having large sequential write operations and very few rewrite operations. A small percentage of rewrites means there is little invalidation and copy-on-write activity for the SMR disk, and so very little provisioning for this rewrite is needed.

Although some embodiments are described as having a single SMR disk, this is not intended to be limiting. The present disclosure applies to data storage systems having a plurality of disk drives, including multiple SMR disk drives.

In an implementation that includes multiple SMR disks, a different virtual address space may be used for each virtual drive implemented on each single SMR disk. A reason for employing different virtual address spaces is to avoid pollution of the addresses. While the space can be scaled on a per virtual drive instance, it may not be possible to govern the use of that space. A single virtual drive instance may come to dominate the address space by consuming a disproportionate amount of the virtual mapping space. As a result, in some embodiments, the VSM mapping space may be married to the virtual drive, thereby allowing each to exist independently of one another. The result is that activity of one virtual drive does not cause mapping events for other logical drives.

Aspects of the present disclosure may be implemented on any suitable apparatus or apparatuses, which may include one or more computers and/or computer related components.

Figure 10:
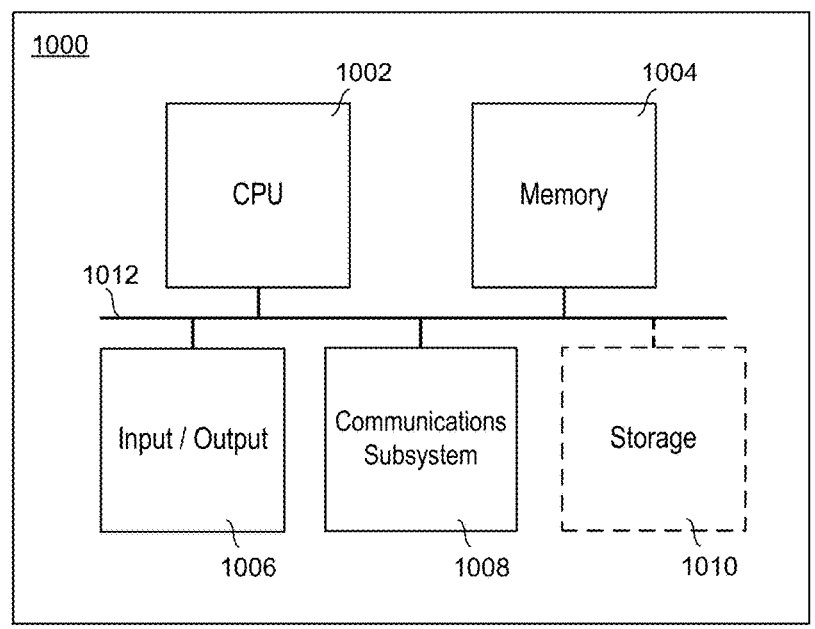
FIG. 10 is a block diagram of an example electronic device that may be used in implementing one or more aspects or components in or more embodiments according to the present disclosure.

FIG. 10 is a block diagram of an example electronic device 1000 that may be used in implementing one or more aspects or components of an embodiment according to the present disclosure. The electronic device may be any suitable type of device, including but not limited to a storage adapter for use with one or more disk drives, such as SMR disks.

The electronic device 1000 may include one or more of a central processing unit (CPU) 1002, memory 1004, an input/output (I/O) interface 1006, a communications subsystem 1008. In some embodiments, the device 1000 may comprise a mass storage device 1010. One or more of the components or subsystems of electronic device 1000 may be interconnected by way of one or more buses 1012 or in any other suitable manner.

The bus 1012 may be one or more of any type of several bus architectures including a memory bus, storage bus, memory controller bus, peripheral bus, or the like. The CPU 1002 may comprise any type of electronic data processor. The memory 1004 may comprise any type of system memory such as dynamic random access memory (DRAM), static random access memory (SRAM), synchronous DRAM (SDRAM), read-only memory (ROM), a combination thereof, or the like. In an embodiment, the memory may include ROM for use at boot-up, and DRAM for program and data storage for use while executing programs.

The mass storage device 1010 may comprise any type of storage device configured to store data, programs, and other information and to make the data, programs, and other information accessible via the bus 1012. The mass storage device 1010 may comprise, for example, one or more SMR disks. The mass storage device 1010 may additionally or alternatively comprise one or more of a solid state drive, hard disk drive, a magnetic disk drive, an optical disk drive, or the like. In some embodiments, data, programs, or other information may be stored remotely, for example in the "cloud". Electronic device 1000 may send or receive information to the remote storage in any suitable way, including via communications subsystem 1008 over a network or other data connection.

The I/O interface 1006 may provide interfaces to couple one or more other devices to the electronic device 1000. The other devices may include a host system implemented on another electronic device, a storage device, an input device, or an output device.

A communications subsystem 1008 may be provided for one or both of transmitting and receiving signals. Communications subsystems 1008 may include any component or collection of components for enabling communications over one or more wired or wireless interfaces. These interfaces may include but are not limited to Universal Serial Bus (USB), Ethernet, high-definition multimedia interface (HDMI), Firewire (e.g. IEEE 1394), Thunderbolt™, WFi™ (e.g. IEEE 802.11), WiMAX (e.g. IEEE 802.16), Bluetooth™, or Near-field communications (NFC), as well as GPRS, UMTS, LTE, LTE-A, dedicated short range communication (DSRC), and IEEE 802.11. Communication subsystem 1008 may include one or more ports or other components for one or more wired connections. Additionally or alternatively, communication subsystem 1008 may include one or more of a transmitter, a receiver, and an antenna element (not shown).

The electronic device 1000 of FIG. 10 is merely an example and is not meant to be limiting. Various embodiments may utilize some or all of the components shown or described. Some embodiments may use other components not shown or described but known to persons skilled in the art.

In the preceding description, for purposes of explanation, numerous details are set forth in order to provide a thorough understanding of the embodiments. However, it will be apparent to one skilled in the art that these specific details are not required. In other instances, well-known electrical structures and circuits are not shown in block diagram form in order not to obscure the understanding.

Embodiments according to the present disclosure may be implemented in software, hardware, firmware, or some combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The structure, features, accessories, and alternatives of specific embodiments described herein and shown in the Figures are intended to apply generally to all of the teachings of the present disclosure, including to all of the embodiments described and illustrated herein, insofar as they are compatible. In other words, the structure, features, accessories, and alternatives of a specific embodiment are not intended to be limited to only that specific embodiment unless so indicated. In addition, reference to an element in the singular, such as by use of the article "a" or "an" is not intended to mean "one and only one" unless specifically so stated, but rather "one or more".

The above-described embodiments are intended to be examples only. Alterations, modifications and variations can be effected to the particular embodiments by those of skill in the art without departing from the scope, which is defined solely by the claims appended hereto.

What is claimed is:

1. A storage adapter device for handling write requests for a shingled magnetic recording (SMR) disk, the storage adapter device comprising:
a memory; and
a processor in communication with the memory, the processor configured to:
receive a request to write new data to a block having a virtual block address, where the SMR disk is configured to write data into a plurality of zones subdivided into a plurality of stripes, and where each stripe is subdivided into a plurality of blocks, and where data written within each zone is written sequentially in the zone in one or more next available stripes;
look up, in metadata stored in the memory, a first logical stripe identifier corresponding to a virtual stripe identifier associated with the virtual block address;
control the SMR disk to read the stripe corresponding to the first logical stripe identifier, modify data of the stripe read by the SMR disk by replacing previous data in the block with the new data, and control the SMR disk to write the modified data of the stripe in a next available stripe on the SMR disk;
update the metadata to replace the mapping of the virtual stripe identifier from the first logical stripe identifier to a second logical stripe identifier corresponding to the location of the next available stripe on the SMR disk; and
maintain an active write pool of available stripes for writing on the SMR disk and a migration pool of available stripes for writing on the SMR disk, said migration pool separate from said active write pool, such that write requests originating from a host system are serviced from the active write pool of available stripes, and such that write requests for a garbage collection procedure use stripes from the migration pool of available stripes for moving valid stripes from a depleted zone to one or more other zones such that moved valid stripes are collected in physical proximity to other moved valid stripes.

2. The storage adapter device of claim 1, wherein when the write request includes writing data to a new block having a virtual block address that is not associated with a logical stripe identifier in the metadata, and where the new block is not part of a plurality of new blocks forming a full stripe to be written as part of the write request, the processor further configured to:
buffer the new block in a cache portion of the memory;
form a new stripe with the new block and other buffered blocks;
control the SMR disk to write the new stripe in a next available stripe on the SMR disk; and
update the metadata to map a virtual stripe identifier associated with the virtual block address to a logical stripe identifier corresponding to the location of the next available stripe on the SMR disk.

3. The storage adapter device of claim 1, wherein the processor is further configured to:
when the write request includes writing new data to all of the blocks of a given stripe, control the SMR disk to write the new data in a next available stripe on the SMR disk without first reading the given stripe from the SMR disk.

4. The storage adapter device of claim 1, wherein the processor is further configured to:
store validity tracking information for tracking whether each of a plurality of stripes within one or more of the zones on the SMR disk is valid or invalid; and
update the validity tracking information to indicate that the stripe on the SMR disk corresponding to the first logical stripe identifier is invalid to reflect the moving of the stripe to the next available stripe on the SMR disk.

5. The storage adapter device of claim 4, wherein the processor is further configured to manage a garbage collection procedure in which the storage adapter device is configured to:
determine that a zone on the SMR disk is depleted when a number of invalid stripes in the zone has exceeded a threshold value based on the validity tracking information;
control the SMR disk to read the valid stripes in the depleted zone;
control the SMR disk to write the data of the valid stripes into available stripes in one or more migration zones other than the depleted zone, wherein the available stripes are obtained from the migration pool of available stripes;
update the metadata to map the virtual stripe identifiers of the valid stripes to logical stripe identifiers corresponding to locations of the available stripes in the one or more migration zones; and
update the validity tracking information to indicate that all of the stripes in the depleted zone are invalid, thereby allowing the depleted zone to be reclaimed.

6. The storage adapter device of claim 5, wherein the processor is further configured to control the SMR disk to reset a write pointer for the depleted zone to the lead block in the depleted zone.

7. The storage adapter device of claim 1, wherein the processor is further configured to store and maintain mappings between virtual stripe identifiers and logical stripe identifiers in the metadata for all blocks allocated to a host system.

8. The storage adapter device of claim 1, wherein the processor is configured to control the SMR disk to write data to a zone in minimum increments of one stripe.

9. A method for handling write requests for a shingled magnetic recording (SMR) disk, the method comprising:
receiving a request to write new data to a block having a virtual block address, where the SMR disk is configured to write data into a plurality of zones subdivided into a plurality of stripes, and where each stripe is subdivided into a plurality of blocks, and where data written within each zone is written sequentially in the zone in one or more next available stripes;
looking up, in metadata stored in a memory, a first logical stripe identifier corresponding to a virtual stripe identifier associated with the virtual block address;
controlling the SMR disk to read the stripe corresponding to the first logical stripe identifier, modifying data of the read stripe by replacing previous data in the block with the new data, and controlling the SMR disk to write the modified data of the stripe in a next available stripe on the SMR disk;
updating the metadata to replace the mapping of the virtual stripe identifier from the first logical stripe identifier to a second logical stripe identifier corresponding to the location of the next available stripe on the SMR disk; and
maintaining an active write pool of available stripes for writing on the SMR disk and a migration pool of available stripes for writing on the SMR disk, said active write pool separate from said migration pool, such that write requests originating from a host system are serviced from the active write pool of available stripes, and such that write requests for a garbage collection procedure use stripes from the migration pool of available stripes for moving valid stripes from a depleted zone to one or more other zones such that moved valid stripes are collected in physical proximity to other moved valid stripes.

10. The method of claim 9, wherein when the write request includes writing data to a new block having a virtual block address that is not associated with a logical stripe identifier in the metadata, and where the new block is not part of a plurality of new blocks forming a full stripe to be written as part of the write request, the method further comprising:
buffering the new block in a cache;
forming a new stripe with the new block and other buffered blocks;
controlling the SMR disk to write the new stripe in a next available stripe on the SMR disk; and
updating the metadata to map a virtual stripe identifier associated with the virtual block address to a logical stripe identifier corresponding to the location of the next available stripe on the SMR disk.

11. The method of claim 9, wherein when the write request includes writing new data to all of the blocks of a given stripe, controlling the SMR disk to write the new data in a next available stripe on the SMR disk without first reading the given stripe from the SMR disk.

12. The method of claim 9, further comprising:
storing validity tracking information for tracking whether each of a plurality of stripes within one or more of the zones on the SMR disk is valid or invalid; and
updating the validity tracking information to indicate that the stripe on the SMR disk corresponding to the first logical stripe identifier is invalid to reflect the moving of the stripe to the next available stripe on the SMR disk.

13. The method of claim 12, further comprising a garbage collection procedure that comprises:
determining that a zone on the SMR disk is depleted when a number of invalid stripes in the zone has exceeded a threshold value based on the validity tracking information;
controlling the SMR disk to read the valid stripes in the depleted zone;
controlling the SMR disk to write the data of the valid stripes into available stripes in one or more migration zones other than the depleted zone, wherein the available stripes are obtained from the migration pool of available stripes;
updating the metadata to map the virtual stripe identifiers of the valid stripes to logical stripe identifiers corresponding to locations of the available stripes in the one or more migration zones; and
updating the validity tracking information to indicate that all of the stripes in the depleted zone are invalid, thereby allowing the depleted zone to be reclaimed.

14. The method of claim 13, further comprising controlling the SMR disk to reset a write pointer for the depleted zone to the lead block in the depleted zone.

15. The method of claim 9, further comprising storing and maintaining mappings between virtual stripe identifiers and logical stripe identifiers in the metadata for all blocks allocated to a host system.

16. The method of claim 9, wherein the SMR disk is controlled to write data to a zone in minimum increments of one stripe.

17. A non-transitory computer-readable storage medium storing instructions that when executed by at least one processor cause the performance of operations for handling write requests for a shingled magnetic recording (SMR) disk, the operations comprising:
receiving a request to write new data to a block having a virtual block address, where the SMR disk is configured to write data into a plurality of zones subdivided into a plurality of stripes, and where each stripe is subdivided into a plurality of blocks, and where data written within each zone is written sequentially in the zone in one or more next available stripes;
looking up, in metadata stored in a memory, a first logical stripe identifier corresponding to a virtual stripe identifier associated with the virtual block address;
controlling the SMR disk to read the stripe corresponding to the first logical stripe identifier, modifying data of the read stripe by replacing previous data in the block with the new data, and controlling the SMR disk to write the modified data of the stripe in a next available stripe on the SMR disk;
updating the metadata to replace the mapping of the virtual stripe identifier from the first logical stripe identifier to a second logical stripe identifier corresponding to the location of the next available stripe on the SMR disk; and
maintaining an active write pool of available stripes for writing on the SMR disk and a migration pool of available stripes for writing on the SMR disk, said active write pool separate from said migration pool, such that write requests originating from a host system are serviced from the active write pool of available stripes, and such that write requests for a garbage collection procedure use stripes from the migration pool of available stripes for moving valid stripes from a depleted zone to one or more other zones such that moved valid stripes are collected in physical proximity to other moved valid stripes.

* * * * *